United States Patent
Ankaiah et al.

(10) Patent No.: US 9,438,558 B2
(45) Date of Patent: Sep. 6, 2016

(54) LINK-LOCAL MULTICAST IN WLAN DEPLOYMENTS

(71) Applicant: Avaya Inc., Basking Ridge, NJ (US)

(72) Inventors: Shashi Hosakere Ankaiah, Bangalore (IN); Vivek L. Atreya, Bangalore (IN); Seemant Choudhary, Fremont, CA (US)

(73) Assignee: Avaya Inc., Santa Clara, CA (US)

( * ) Notice: Subject to any disclaimer, the term of this patent is extended or adjusted under 35 U.S.C. 154(b) by 194 days.

(21) Appl. No.: 14/033,448

(22) Filed: Sep. 21, 2013

(65) Prior Publication Data
US 2015/0085733 A1    Mar. 26, 2015

(51) Int. Cl.
| | |
|---|---|
| *H04H 20/71* | (2008.01) |
| *H04L 29/12* | (2006.01) |
| *H04L 12/18* | (2006.01) |
| *H04W 84/12* | (2009.01) |
| *H04L 12/46* | (2006.01) |

(52) U.S. Cl.
CPC ....... *H04L 61/2069* (2013.01); *H04L 12/1886* (2013.01); *H04L 12/4633* (2013.01); *H04L 12/4641* (2013.01); *H04W 84/12* (2013.01)

(58) Field of Classification Search
USPC ....... 370/312, 390, 432, 328, 401, 397, 449, 370/389, 469, 400
See application file for complete search history.

(56) References Cited

U.S. PATENT DOCUMENTS

| | | | |
|---|---|---|---|
| 6,331,983 B1 * | 12/2001 | Haggerty et al. | 370/400 |
| 7,969,980 B1 * | 6/2011 | Florit et al. | 370/390 |
| 8,848,609 B2 * | 9/2014 | Hsiao | H04W 4/06 370/328 |
| 2007/0086458 A1 * | 4/2007 | Narayanan | H04L 12/185 370/390 |

* cited by examiner

*Primary Examiner* — Chi H Pham
*Assistant Examiner* — Alexander O Boakye

(57) ABSTRACT

Some implementations can include a method including reserving a range of multicast addresses for handling link-local multicasts and generating a multicast group within the range for each VLAN. The method can also include subscribing at an access point to a corresponding multicast group for a VLAN when a client associates with the access point, and tunneling link local multicast traffic from the client to a WSP component via an access tunnel. The method can further include forwarding the link local multicast traffic from the WSP component to subscribing access points.

17 Claims, 4 Drawing Sheets

LINK-LOCAL MULTICAST IN WLAN DEPLOYMENTS

FIELD

Embodiments relate generally to computer networks and more particularly, to systems methods and computer readable media for link-local multicast in WLAN deployments.

BACKGROUND

An overlay deployment model is a commonly used deployment in wireless network applications. The overlay deployment model co-locates wireless control plane (WCP) functions and wireless switching plane (WSP) functions in a single device called a wireless controller (WC). A split plane architecture decouples the wireless control plane functions from the wireless switching plane functions into separate devices. Wireless control plane functions can be implemented in a virtual appliance or on hardware devices. A device that implements only wireless control plane functions is called a wireless control point.

Wireless switching plane functions can be integrated into a switch (e.g. stackable or core switches) when an enterprise is using a switching infrastructure. Wireless switching plane functions can also be provided on a wireless control plane managed wireless switching plane and an enterprise deployment that does not use a switching infrastructure.

In a centralized forwarding deployment, the WSP functions reside outside the access points (APs). An access point forwards traffic to the device that implements the WSP function. An overlay deployment model is an example of centralized forwarding. A split plane deployment model is also an example of centralized forwarding. These two deployment models are illustrated in FIGS. 1A and 1B.

In conventional WLAN deployments, access points terminate an access tunnel on the WSP component of the controller. The WSP component typically supports tens of physical ports and thousands of logical ports (access tunnels).

Access points tunnel client traffic to WSP components using CAPWAP encapsulation. The WSP components on the controller decapsulate the frame and submit the frame to forwarding logic. The WSP component also receives the frame from a wired network and submits the frame to forwarding logic.

Forwarding logic computes the transmitting ports based on the destination MAC address. The egress ports are a set of physical and logical ports in the network if the frame is destined towards a multicast group. One of the drawbacks in a centralized WLAN deployment can be that an increase in the number of logical ports (tunnels) may slow down the multicast forwarding and therefore affect multicast throughput of the system. For example, a copy of each multicast frame may need to be sent on each of the tunnels in a VLAN. This can consume processing cycles at the WSP thus bringing down the multicast throughput. Also, the multicast frames may be encapsulated and sent as unicast packets over the tunnels. This can increase the traffic by N times in the part of the network between the WSP and the AP, where N is the number of access tunnels.

Embodiments were conceived in light of the above-mentioned problems and limitations, among other things.

SUMMARY

Some implementations can include a method including reserving a range of multicast addresses for handling link-local multicasts and generating a multicast group within the range for each VLAN. The method can also include subscribing at an access point to a corresponding multicast group for a VLAN when a client associates with the access point, and tunneling link local multicast traffic from the client to a WSP component via an access tunnel. The method can further include forwarding the link local multicast traffic from the WSP component to subscribing access points.

The range can include an administratively scoped multicast group range. Subscribing can include sending an IGMP join message for the corresponding multicast group.

The forwarding can include encapsulating frame using a generated multicast group for the received VLAN and forwarding the frame to members in the generated multicast group for that VLAN. The forwarding can also include receiving the frame at access points subscribed to the group and decapsulating the frame at the access points and forwarding the frame to clients subscribed to an inner multicast group.

The network can include a plurality of WSP components. The method can include electing one of the plurality of WSP components as a gateway WSP for each VLAN. The gateway WSP component receives link local multicast traffic on the VLAN and transmits on a multicast group for that VLAN.

Some implementations can include a system comprising one or more processors configured to perform operations. The operations can include reserving a range of multicast addresses for handling link-local multicasts and generating a multicast group within the range for each VLAN. The operations can also include subscribing at an access point to a corresponding multicast group for a VLAN when a client associates with the access point, and tunneling link local multicast traffic from the client to a WSP component via an access tunnel. The operations can further include forwarding the link local multicast traffic from the WSP component to subscribing access points.

The range can include an administratively scoped multicast group range. Subscribing can include sending an IGMP join message for the corresponding multicast group.

The forwarding can include encapsulating frame using a generated multicast group for the received VLAN and forwarding the frame to members in the generated multicast group for that VLAN. The forwarding can also include receiving the frame at access points subscribed to the group and decapsulating the frame at the access points and forwarding the frame to clients subscribed to an inner multicast group.

The network can include a plurality of WSP components. The operations can include electing one of the plurality of WSP components as a gateway WSP for each VLAN. The gateway WSP component receives link local multicast traffic on the VLAN and transmits on a multicast group for that VLAN.

Some implementations can include a nontransitory computer readable medium having stored thereon software instructions that, when executed by a processor of a wireless controller, cause the processor to perform operations. The operations can include reserving a range of multicast addresses for handling link-local multicasts and generating a multicast group within the range for each VLAN. The operations can also include subscribing at an access point to a corresponding multicast group for a VLAN when a client associates with the access point, and tunneling link local multicast traffic from the client to a WSP component via an access tunnel. The operations can further include forwarding the link local multicast traffic from the WSP component to subscribing access points.

The range can include an administratively scoped multicast group range. Subscribing can include sending an IGMP join message for the corresponding multicast group.

The forwarding can include encapsulating frame using a generated multicast group for the received VLAN and forwarding the frame to members in the generated multicast group for that VLAN. The forwarding can also include receiving the frame at access points subscribed to the group and decapsulating the frame at the access points and forwarding the frame to clients subscribed to an inner multicast group.

The network can include a plurality of WSP components. The operations can include electing one of the plurality of WSP components as a gateway WSP for each VLAN. The gateway WSP component receives link local multicast traffic on the VLAN and transmits on a multicast group for that VLAN.

DETAILED DESCRIPTION

Figure 1A:
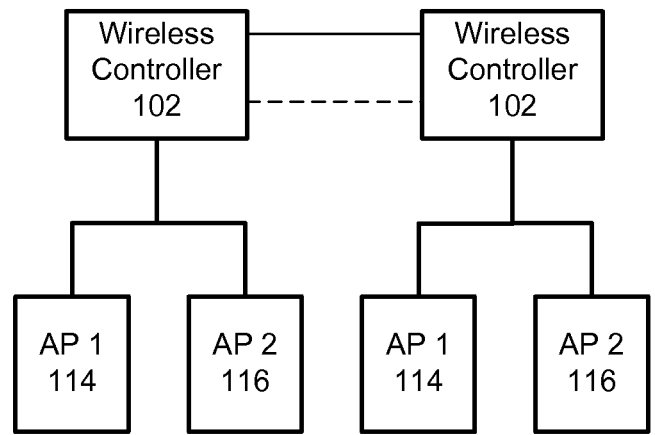
FIGS. 1A and 1B are diagrams of examples centralized forwarding in overlay and split plane deployments.

FIG. 1A is a diagram of an example overlay deployment having centralized forwarding. In particular, wireless controllers 102, 104 are connected to respective sets of access points 106/108 and 110/112.

Figure 1B:
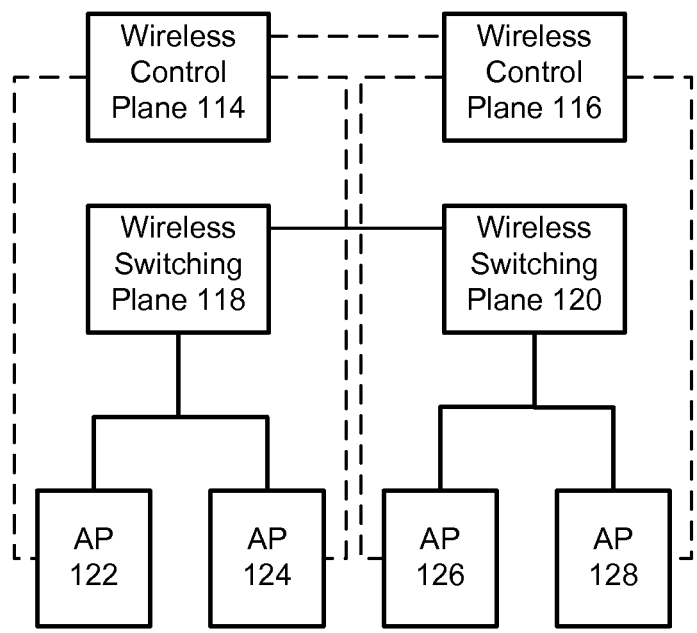

FIG. 1B is a diagram of an example split plane deployment having centralized forwarding. In FIG. B, wireless control plane devices 114, 116 control wireless switching plane devices 118, 120. The wireless control plane devices 114, 116 and the wireless switching plane devices 118, 120 are both in communication with a plurality of access points 122-128.

In the centralized forwarding examples of FIGS. 1A and 1B, WSP functions reside outside the access points, the access points forward traffic to the device that implement the WSP function. The overlay deployment model shown in FIG. 1A is an example of centralized forwarding. And the split plane deployment model shown in FIG. 1B is also an example of centralized forwarding.

Figure 2:
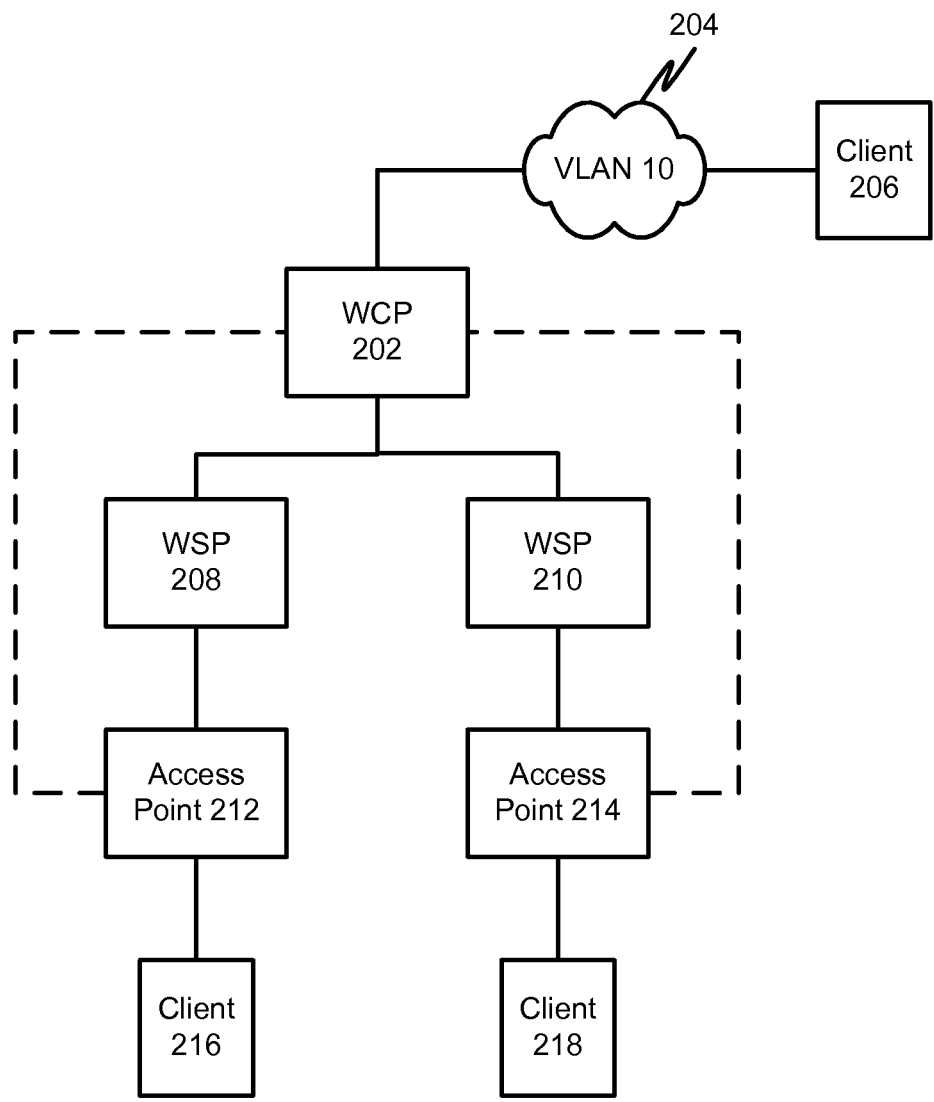
FIG. 2 is a diagram of an example link local multicast forwarding system in accordance with at least one embodiment.

FIG. 2 is an example of a network 200 for handling link local multicast in accordance with at least one embodiment. In particular, the network 200 includes a wireless control plane component 202, a VLAN 204, and a client 206. The network 200 also includes a plurality of wireless switching plane components 208, 210 and the plurality of access points 212, 214. A client 216 is connected to access point 212 and a client 218 is connected to access point 214. In an example of operation of the network 200, a group address (e.g. 239.10.0.0) is reserved for multicast traffic encapsulation. The client 216 associates with AP212 and VLAN 10 (e.g.

204). The AP212 looks up the multicast group address for VLAN 10 and determines that in this example, it is 239.10.0.10.

The access point 212 issues an IGMP join message for group address 239.10.0.10 and releases the frame over the physical interface. The client 206 in VLAN 10 sends traffic to a subscribing group (e.g., "group X").

The WSP component (e.g. 208 or 210) encapsulates the traffic with group IP 239.10.0.10 and releases the traffic over physical interfaces. The access point 212 receives the frame, decapsulates the frame, and forwards the frames to members of group X in VLAN 10.

Figure 3:
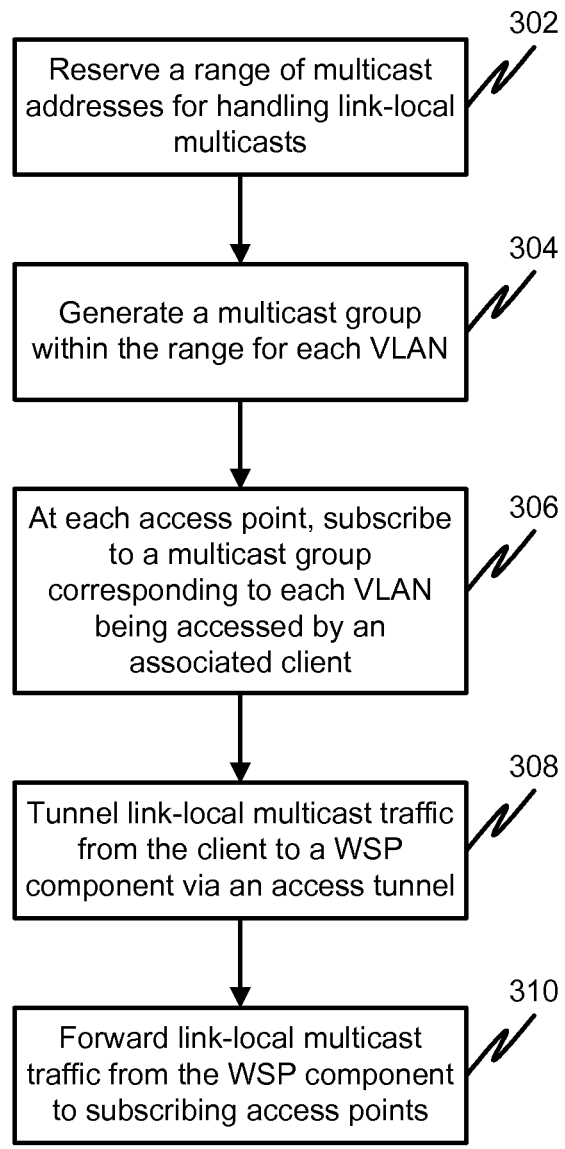
FIG. 3 is a flowchart of an example method for link local multicast in WLAN deployments in accordance with at least one embodiment.

FIG. 3 is a flowchart of an example method for a link local multicast in a WLAN deployment. Processing begins at 302, where a range of multicast addresses is reserved for handling link local multicasts. Processing continues to 304. At 304, a multicast group within the range of addresses is generated for each VLAN. Processing continues to 306.

At 306, an access point subscribes to a corresponding multicast group for a VLAN when a client associates with that access point. The subscribing can include, for example, sending an IGMP join message for that address. Processing continues to 308.

At 308, link local multicast traffic is tunneled from the client to a WSP component via an access tunnel. Processing continues to 310.

At 310, link local multicast traffic is forwarded from the WSP component to subscribing access points. The forwarding at the WSP component, which may act as a VLAN gateway for the VLAN on receiving multicast traffic can include encapsulating the frame using the generated multicast group for the received VLAN. The forwarding can also include forwarding the frame to the members in the generated multicast group for that VLAN. Access points which are subscribed to the group receive the frame. The access points decapsulate the frame and forward the frame to the clients who are subscribed to an inner multicast group.

A network can include multiple WSP components. If multiple WSP components are present, an election can be performed among the WSP components to choose one of them as the gateway for each VLAN. The gateway takes the link local multicast traffic on the VLAN and transmits it to the multicast group for that VLAN. This is done to help ensure that multiple WSPs on the same VLAN do not send out multiple copies of the same incoming packet.

It will be appreciated that 302-310 can be performed in whole or in part in order to accomplish a contemplated link local multicast task.

Figure 4:
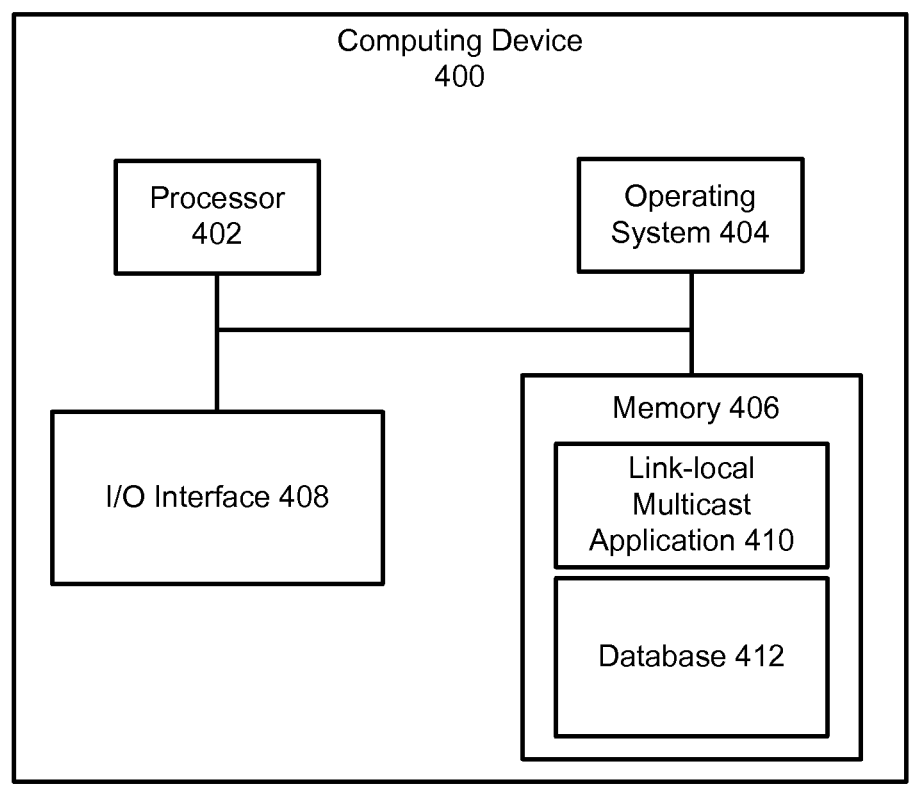
FIG. 4 is a diagram of a computer system for link local multicast in accordance with at least one embodiment.

FIG. 4 is a diagram of an example computer system 400 in accordance with at least one implementation. The computer 400 includes a processor 402, operating system 404, memory 406 and I/O interface 408. The memory 406 can include a link-local multicast in WLAN deployments application 410 and a database 412.

In operation, the processor 402 may execute the application 410 stored in the memory 406. The application 410 can include software instructions that, when executed by the processor, cause the processor to perform operations for network management in accordance with the present disclosure (e.g., performing one or more of steps 302-310).

The application program 410 can operate in conjunction with the database 412 and the operating system 404.

It will be appreciated that the modules, processes, systems, and sections described above can be implemented in hardware, hardware programmed by software, software instructions stored on a nontransitory computer readable medium or a combination of the above. A system as described above, for example, can include a processor configured to execute a sequence of programmed instructions stored on a nontransitory computer readable medium. For example, the processor can include, but not be limited to, a personal computer or workstation or other such computing system that includes a processor, microprocessor, microcontroller device, or is comprised of control logic including integrated circuits such as, for example, an Application Specific Integrated Circuit (ASIC). The instructions can be compiled from source code instructions provided in accordance with a programming language such as Java, C, C++, C#.net, assembly or the like. The instructions can also comprise code and data objects provided in accordance with, for example, the Visual Basic™ language, or another structured or object-oriented programming language. The sequence of programmed instructions, or programmable logic device configuration software, and data associated therewith can be stored in a nontransitory computer-readable medium such as a computer memory or storage device which may be any suitable memory apparatus, such as, but not limited to ROM, PROM, EEPROM, RAM, flash memory, disk drive and the like.

Furthermore, the modules, processes systems, and sections can be implemented as a single processor or as a distributed processor. Further, it should be appreciated that the steps mentioned above may be performed on a single or distributed processor (single and/or multi-core, or cloud computing system). Also, the processes, system components, modules, and sub-modules described in the various figures of and for embodiments above may be distributed across multiple computers or systems or may be co-located in a single processor or system. Example structural embodiment alternatives suitable for implementing the modules, sections, systems, means, or processes described herein are provided below.

The modules, processors or systems described above can be implemented as a programmed general purpose computer, an electronic device programmed with microcode, a hard-wired analog logic circuit, software stored on a computer-readable medium or signal, an optical computing device, a networked system of electronic and/or optical devices, a special purpose computing device, an integrated circuit device, a semiconductor chip, and/or a software module or object stored on a computer-readable medium or signal, for example.

Embodiments of the method and system (or their subcomponents or modules), may be implemented on a general-purpose computer, a special-purpose computer, a programmed microprocessor or microcontroller and peripheral integrated circuit element, an ASIC or other integrated circuit, a digital signal processor, a hardwired electronic or logic circuit such as a discrete element circuit, a programmed logic circuit such as a PLD, PLA, FPGA, PAL, or the like. In general, any processor capable of implementing the functions or steps described herein can be used to implement embodiments of the method, system, or a computer program product (software program stored on a nontransitory computer readable medium).

Furthermore, embodiments of the disclosed method, system, and computer program product (or software instructions stored on a nontransitory computer readable medium) may be readily implemented, fully or partially, in software using, for example, object or object-oriented software development environments that provide portable source code that can be used on a variety of computer platforms. Alternatively, embodiments of the disclosed method, system, and computer program product can be implemented partially or fully in hardware using, for example, standard logic circuits or a VLSI design. Other hardware or software can be used to implement embodiments depending on the speed and/or efficiency requirements of the systems, the particular function, and/or particular software or hardware system, microprocessor, or microcomputer being utilized. Embodiments of the method, system, and computer program product can be implemented in hardware and/or software using any known or later developed systems or structures, devices and/or software by those of ordinary skill in the applicable art from the function description provided herein and with a general basic knowledge of the software engineering and computer networking arts.

Moreover, embodiments of the disclosed method, system, and computer readable media (or computer program product) can be implemented in software executed on a programmed general purpose computer, a special purpose computer, a microprocessor, a network server or switch, or the like.

It is, therefore, apparent that there is provided, in accordance with the various embodiments disclosed herein, methods, systems and computer readable media for link-local multicast in WLAN deployments.

While the disclosed subject matter has been described in conjunction with a number of embodiments, it is evident that many alternatives, modifications and variations would be, or are, apparent to those of ordinary skill in the applicable arts. Accordingly, Applicants intend to embrace all such alternatives, modifications, equivalents and variations that are within the spirit and scope of the disclosed subject matter.

What is claimed is:

1. A method comprising:
reserving a range of multicast addresses for handling link-local multicasts within a network;
generating a multicast group within the range for each VLAN;
subscribing at an access point to a corresponding multicast group for a VLAN when a client associates with the access point;
tunneling link local multicast traffic from the client to a WSP component via an access tunnel; and
forwarding the link local multicast traffic from the WSP component to subscribing access points,
wherein the forwarding includes:
encapsulating frame using a generated multicast group for the received VLAN;
forwarding the frame to members in the generated multicast group for that VLAN;
receiving the frame at access points subscribed to the group; and
decapsulating the frame at the access points and forwarding the frame to clients subscribed to an inner multicast group.

2. The method of claim 1, wherein the range includes an administratively scoped multicast group range.

3. The method of claim 1, wherein subscribing includes sending an IGMP join message for the corresponding multicast group.

4. The method of claim 1, wherein the network includes a plurality of WSP components.

5. The method of claim 4, further comprising electing one of the plurality of WSP components as a gateway WSP for each VLAN.

6. The method of claim 5, wherein the gateway WSP component receives link local multicast traffic on the VLAN and transmits on a multicast group for that VLAN.

7. A system comprising one or more processors configured to perform operations including:
- reserving a range of multicast addresses for handling link-local multicasts within a network;
- generating a multicast group within the range for each VLAN;
- subscribing at an access point to a corresponding multicast group for a VLAN when a client associates with the access point;
- tunneling link local multicast traffic from the client to a WSP component via an access tunnel; and
- forwarding the link local multicast traffic from the WSP component to subscribing access points wherein the forwarding includes:
- encapsulating frame using a generated multicast group for the received VLAN;
- forwarding the frame to members in the generated multicast group for that VLAN;
- receiving the frame at access points subscribed to the group; and
- decapsulating the frame at the access points and forwarding the frame to clients subscribed to an inner multicast group.

8. The system of claim 7, wherein the range includes an administratively scoped multicast group range.

9. The system of claim 7, wherein subscribing includes sending an IGMP join message for the corresponding multicast group.

10. The system of claim 7, wherein the network includes a plurality of WSP components.

11. The system of claim 10, further comprising electing one of the plurality of WSP components as a gateway WSP for each VLAN.

12. The system of claim 11, wherein the gateway WSP component receives link local multicast traffic on the VLAN and transmits on a multicast group for that VLAN.

13. A nontransitory computer readable medium having stored thereon software instructions that, when executed by a processor of a wireless controller, cause the processor to perform operations including:
- reserving a range of multicast addresses for handling link-local multicasts within a network;
- generating a multicast group within the range for each VLAN;
- subscribing at an access point to a corresponding multicast group for a VLAN when a client associates with the access point;
- tunneling link local multicast traffic from the client to a WSP component via an access tunnel; and
- forwarding the link local multicast traffic from the WSP component to subscribing access points wherein the forwarding includes:
- encapsulating frame using a generated multicast group for the received VLAN;
- forwarding the frame to members in the generated multicast group for that VLAN;
- receiving the frame at access points subscribed to the group; and
- decapsulating the frame at the access points and forwarding the frame to clients subscribed to an inner multicast group.

14. The nontransitory computer readable medium of claim 13, wherein the range includes an administratively scoped multicast group range.

15. The nontransitory computer readable medium of claim 13, wherein subscribing includes sending an IGMP join message for the corresponding multicast group.

16. The nontransitory computer readable medium of claim 13, wherein the network includes a plurality of WSP components.

17. A nontransitory computer readable medium having stored thereon software instructions that, when executed by a processor of a wireless controller, cause the processor to perform operations including:
- reserving a range of multicast addresses for handling link-local multicasts within a network;
- generating a multicast group within the range for each VLAN;
- subscribing at an access point to a corresponding multicast group for a VLAN when a client associates with the access point;
- tunneling link local multicast traffic from the client to a WSP component via an access tunnel;
- forwarding the link local multicast traffic from the WSP component to subscribing access points; and
- electing one of the plurality of WSP components as a gateway WSP for each VLAN, and the gateway WSP component receives link local multicast traffic on the VLAN and transmits on a multicast group for that VLAN, wherein the network includes a plurality of WSP components.

* * * * *